United States Patent [19]
Rozak

[11] Patent Number: 5,857,172
[45] Date of Patent: *Jan. 5, 1999

[54] ACTIVATION CONTROL OF A SPEECH RECOGNIZER THROUGH USE OF A POINTING DEVICE

[75] Inventor: Michael J. Rozak, Issaquah, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 506,999

[22] Filed: Jul. 31, 1995

[51] Int. Cl.$^6$ .................................................... G10L 9/06
[52] U.S. Cl. ....................... 704/275; 704/270; 704/273; 704/200
[58] Field of Search ................................ 395/2.84, 2.82, 395/2; 704/270

[56] References Cited

U.S. PATENT DOCUMENTS

| | | | |
|---|---|---|---|
| 4,509,133 | 4/1985 | Monbaron et al. | 364/513.5 |
| 4,677,569 | 6/1987 | Nakano et al. | 364/513.5 |
| 4,704,696 | 11/1987 | Reimer et al. | 364/513.5 |
| 4,766,529 | 8/1988 | Nakano et al. | 364/513.5 |
| 4,776,016 | 10/1988 | Hansen | 381/42 |
| 4,783,803 | 11/1988 | Baker et al. | 381/42 |
| 4,827,520 | 5/1989 | Zeinstra | 381/43 |
| 4,864,623 | 9/1989 | Van Nes et al. | 395/2.84 |
| 4,866,778 | 9/1989 | Baker | 381/43 |
| 4,903,012 | 2/1990 | Ohuchi | 340/709 |
| 4,931,950 | 6/1990 | Isle et al. | 364/513 |
| 4,987,411 | 1/1991 | Ishigami | 340/709 |
| 5,027,406 | 6/1991 | Roberts et al. | 381/43 |
| 5,075,675 | 12/1991 | Barker et al. | 340/721 |
| 5,157,384 | 10/1992 | Greanias et al. | 340/706 |
| 5,231,670 | 7/1993 | Goldhor et al. | 381/43 |
| 5,231,691 | 7/1993 | Yasuda | 395/2 |
| 5,255,341 | 10/1993 | Nakajima | 395/2 |
| 5,265,202 | 11/1993 | Krueger et al. | 395/158 |
| 5,357,596 | 10/1994 | Takebayashi et al. | 395/2.84 |
| 5,384,910 | 1/1995 | Torres | 395/156 |
| 5,386,494 | 1/1995 | White | 395/2.84 |
| 5,404,458 | 4/1995 | Zetts | 395/275 |
| 5,408,582 | 4/1995 | Colier | 395/2.52 |
| 5,425,141 | 6/1995 | Gedye | 395/157 |

(List continued on next page.)

OTHER PUBLICATIONS

Kurzweil, "Kurzweil Brings Voice Dictation to Windows," *Byte*, 19(8):48, Aug., 1994.
Meisel, William S., "Talk to Your Computer," *BYTE*, 18(11): 113, Oct., 1993.
Schmandt et al., "Augmenting a Window System with Speech Input," *Computer*, 23(8): 50–56, Aug., 1990.
Borgen et al., "Voice Navigator—Owner's Guide," *Articulate Systems, Inc.*, pp. 4, 11–12, 25–27, and 43–44, 1990.
"Integrated Audio–Graphics User Interface," *IBM Technical Disclosure Bulletin*, 33(11): 368–371, Apr. 1991.
"Software User's Guide," *Microsoft Windows Sound System Version 2.0*, pp. 28–70, 1993.

*Primary Examiner*—David R. Hudspeth
*Assistant Examiner*—Vijay B. Chawan
*Attorney, Agent, or Firm*—Westman, Champlin & Kelly, P.A.

[57] ABSTRACT

A speech recognition system includes a facility for toggling the state of the speech recognition system solely in response to a user using a pointing input device, such as a mouse. In one embodiment of the present invention, a user designates a predetermined area of a display surface on a video display to be a hot region. When a mouse cursor points to a location within the hot region, the speech recognition system is put in a listening state wherein the speech recognition system is listening for and processing audio input. When the mouse cursor is moved so as to no longer lie within the designated hot region, the state of the speech recognition system is changed back to the state that immediately preceded the listening state. The previous state may be a not listening state where an audio input is not processed by the speech recognition system or a standing-by state wherein only selected audio input is processed by the speech recognition system.

16 Claims, 9 Drawing Sheets

U.S. PATENT DOCUMENTS

| | | | |
|---|---|---|---|
| 5,444,617 | 8/1995 | Merialdo | 364/419.1 |
| 5,448,695 | 9/1995 | Douglas et al. | 395/155 |
| 5,465,378 | 11/1995 | Duensing et al. | 395/800 |
| 5,519,809 | 5/1996 | Husseiny et al. | 395/2.84 |
| 5,524,051 | 6/1996 | Ryan | 380/9 |
| 5,566,248 | 10/1996 | Ulrich | 382/187 |
| 5,590,264 | 12/1996 | Keane et al. | 395/340 |
| 5,602,963 | 2/1997 | Bissonnette et al. | 395/2.84 |
| 5,602,981 | 2/1997 | Hargrove | 395/352 |
| 5,617,526 | 4/1997 | Oran et al. | 395/326 |

# ACTIVATION CONTROL OF A SPEECH RECOGNIZER THROUGH USE OF A POINTING DEVICE

TECHNICAL FIELD

The present invention relates generally to computer systems and, more particularly, to the use of pointing input devices to control the activation of a speech recognizer in computer systems.

BACKGROUND OF THE INVENTION

Speech recognizers receive and process audio input in order to recognize speech components within the audio input. Certain conventional speech recognizers enable a user to input audio data by speaking into a microphone or other audio input device. The resulting audio input is received and processed by a speech recognizer to identify speech components in the audio input. One difficulty encountered with such conventional systems is that the speech recognizer is either always listening and processing input or not listening. When the speech recognizer is active and listening, all audio input is processed, even audio input in the form of background noise and inadvertent comments by a speaker. As a result, the speech recognizer performs a great deal of unnecessary processing and often produces erroneous results. One proposed solution to this problem has been to have the speech recognizer only be responsive to phrases that are prefaced with a trigger term, such as "computer". Another proposed solution has been to designate a key on the keyboard that acts like an intercom button such that when the designated key is depressed the speech recognizer is active and listening. When the designated key is not depressed, the speech recognizer is not listening.

SUMMARY OF THE INVENTION

The limitations of the conventional speech recognizer systems are overcome by the present invention. In accordance with a first aspect of the present invention a method is practiced in a computer system that has a video display and an audio input device for receiving audio input. The computer system also includes an input device for positioning a cursor on the video display and a speech recognizer for recognizing components of speech in audio input. Per this method, a designated hot region is provided on the video display for activating the speech recognizer. The cursor is positioned over the hot region in response to a user using the input device for positioning the cursor. This speech recognizer is then activated in response to the cursor being positioned over the hot region such that the speech recognizer processes audio input that is received through the audio input device. Thus, merely by positioning the cursor within the hot region, the user activates the speech recognizer.

In accordance with another aspect of the present invention a method is practiced in a computer system that has a mouse and an audio input device for receiving audio input. Per the method, a speech recognizer is provided for listening for audio input to recognize speech components in the audio input when in an active state. When the speech recognizer is in an inactive state, the speech recognizer is not listening for the audio input. A current state of the speech recognizer is either the active state or the inactive state. In response to the user moving a mouse, the current state of the speech recognizer is toggled. Hence, the current state is changed to the active state if the speech recognizer was just previously in inactive state and the current state is changed to the inactive state if the speech recognizer was just previously in the active state.

In accordance with a further aspect of the present invention a computer system includes a pointing input device and an audio input device for receiving audio input. The computer system additionally includes a speech recognizer for recognizing components of speech in the audio input received by the audio input device. A triggering mechanism is provided in a computer system for triggering the speech recognizer so that the speech recognizer is active and processing audio input in response to movements of the pointing input device by user.

In accordance with an additional aspect of the present invention, a computer readable storage medium is provided for use in a computer system that includes a video display, an audio input device and a pointing input device. The computer readable storage medium stores a speech recognizer for recognizing components of speech in audio input that is received from the audio input device. The computer readable storage medium further stores a triggering mechanism for triggering the speech recognizer to be active so that the speech recognizer processes audio input from the audio input device in response to a user using the pointing input device.

BRIEF DESCRIPTION OF THE DRAWINGS

A preferred embodiment of the present invention will be described below with reference to the following drawings.

DETAILED DESCRIPTION OF THE INVENTION

The preferred embodiment of the present invention provides a speech recognition system that allows a user to activate and deactivate a speech recognizer simply by using a pointing input device, such as a mouse. One or more hot regions may be designated on a display surface such that when a cursor is manipulated so that at least a portion of the cursor is positioned over one of the hot regions, the speech recognizer is triggered to be active in response. When the speech recognizer is active, the speech recognizer listens and processes audio input. The speech recognizer remains active as long as a hot spot of the cursor lies within a designated hot region. As soon as the cursor is positioned such that it's hot spot lies outside the hot region, the speech recognizer returns to immediately previous state. This mechanism provides a simple and intuitive means for a user to regulate the activation of the speech recognizer so that undue processing and erroneous processing does not occur.

Figure 1:
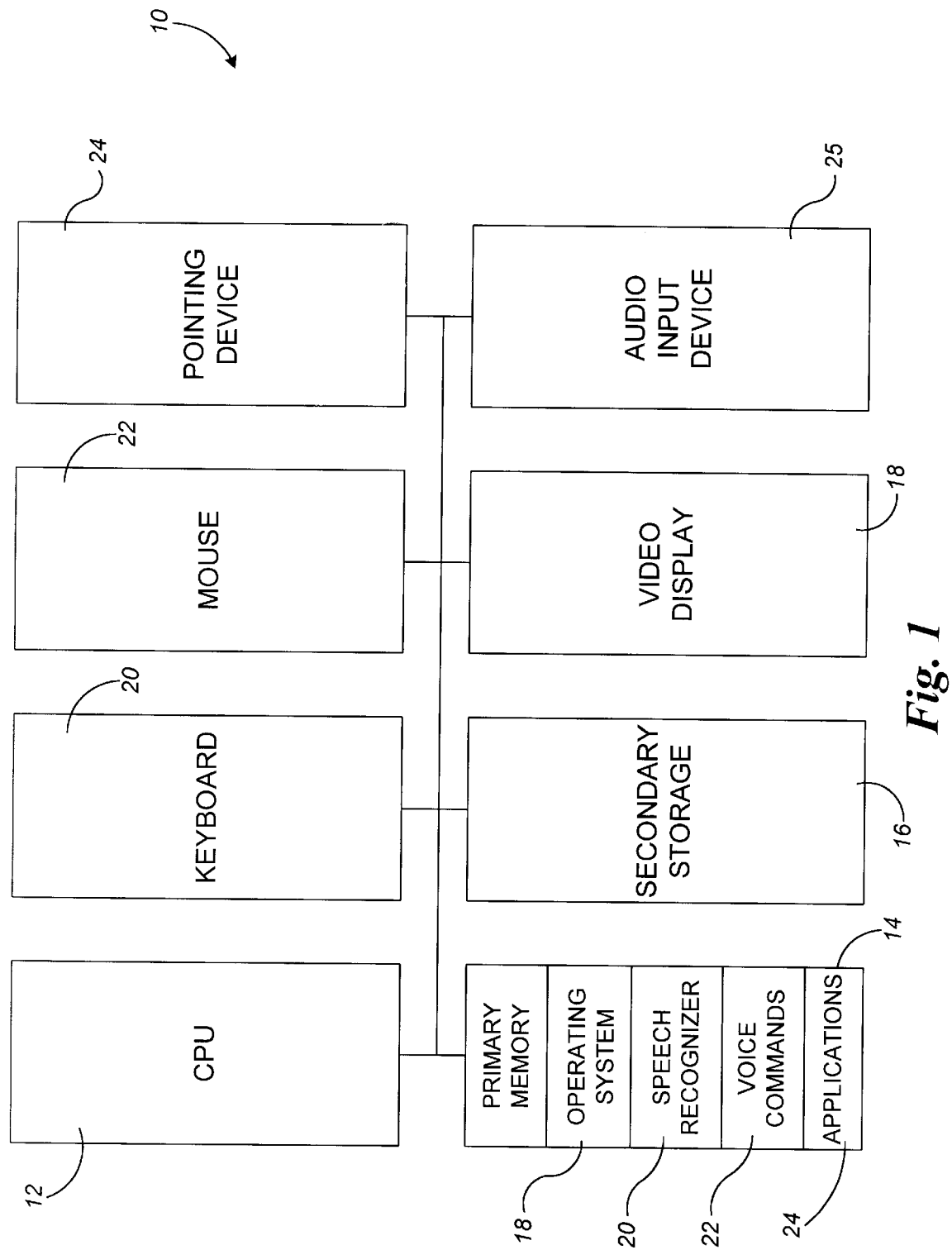
FIG. 1 is a block diagram of a computer system that is suitable for practicing the preferred embodiment of the present invention.

FIG. 1 is a block diagram of a computer system 10 that is suitable for practicing the preferred embodiment of the present invention. FIG. 1 depicts a single processor system; nevertheless, those skilled in the art will appreciate that the present invention may also be practiced in multiprocessor systems, including distributed systems. The computer system 10 includes a central processing unit (CPU) 12 that has access to a primary memory 14 and a secondary storage 16. The primary memory 14 holds a copy of an operating system 18. For illustrative purposes in the discussion below, it is assumed that the operating system 18 is the "MICROSOFT" "WINDOWS" '95 operating system from Microsoft Corporation of Redmond, Wash. The memory also holds a copy of a speech recognizer 20 and code for implementing voice commands 22. The speech recognizer 20 includes code for recognizing components of speech in audio input. In the preferred embodiment of the present invention, the recognized components of speech may be translated to text that is forwarded to the code for the voice commands 22, which in turn uses the text to trigger activities responsive to voice commands. The memory 14 may also hold a number of application programs 24 that utilize the speech recognizer 20 and the code for the voice commands 22.

The computer system 10 additionally includes a video display 18, a keyboard 20, a mouse 22 and a pointing device 24 (such as a digital tablet or pen device). An audio input device, such as a microphone, is also provided in the computer system 10 to receive audio input.

The preferred embodiment of the present invention is designed to respond to voice commands that are entered by a user through the audio input device 25. The speech recognizer 20 is responsible for recognizing speech components and passing the recognized speech components to the code for voice commands 22 that responds to any voice commands that are found in the audio input. The preferred embodiment of the present invention may operate in one of three states: listening, standing-by or not listening. In the listening state, the speech recognizer 20 is active and is listening continuously for audio input from the audio input device 25. In the standing-by state the speech recognizer 20 is listening only for commands that are prefaced by the trigger word "computer". For example, the speech recognizer 20 and code for voice commands 22 would not be responsive to the voice command "open word processor" unless the voice command was prefaced by the trigger term "computer". In the standing-by state, the computer system 10 processes the audio input but does not react to commands unless they are prefaced by the trigger word. In the not listening state, the speech recognizer 20 does not process any of the audio input from the audio input device 25.

The preferred embodiment of the present invention is adapted for providing intermittent operation of the speech recognizer 20. Specifically, the preferred embodiment of the present invention is adapted for use when the user has selected the standing-by state or the not listening state as the current state for processing voice commands. The preferred embodiment of the present invention does not produce any noticeable effect when the user has selected the listening state as the current state. Those skilled in the art will appreciate that the present invention may also be used to trigger activation of the speech recognizer for dictation or other purposes.

Figure 2:
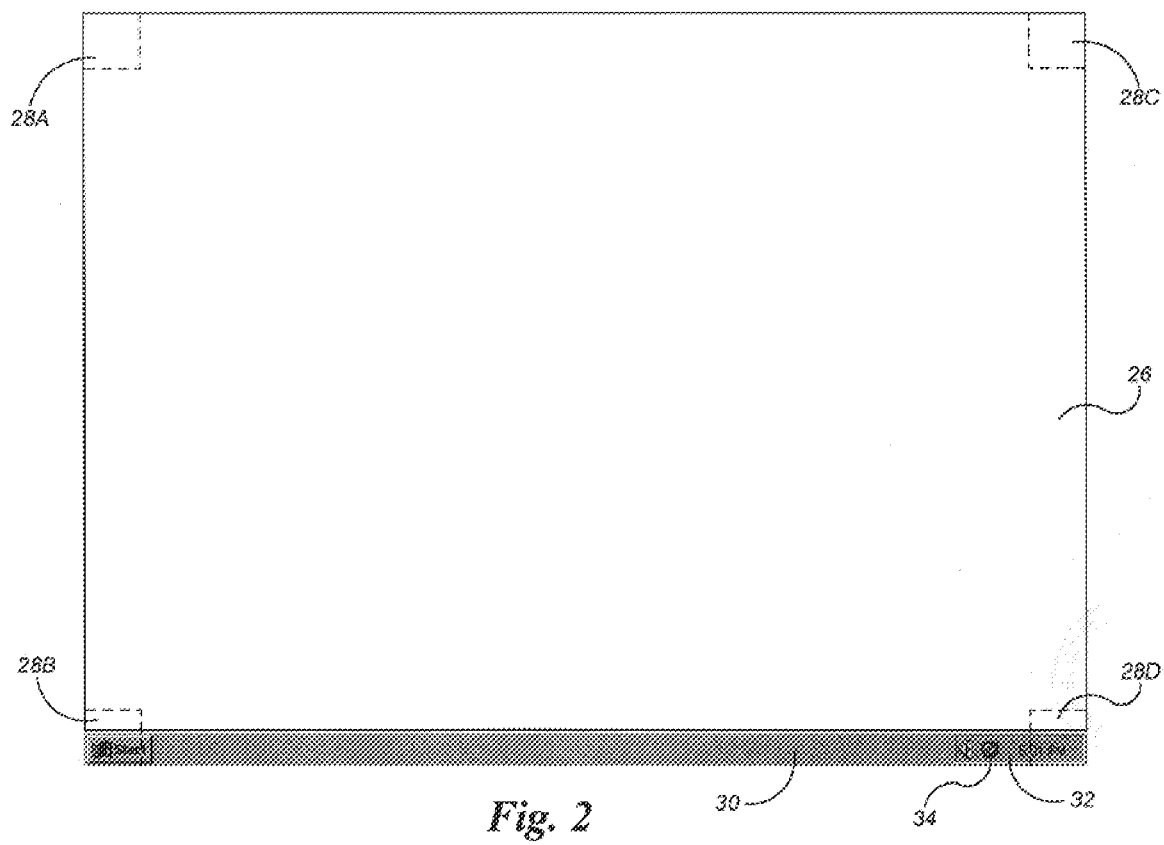
FIG. 2 is a diagram depicting exemplary choices of hot regions for use in the preferred embodiment of the present invention.

As was mentioned above, the preferred embodiment of the present invention provides the user with the ability to designate and change which hot regions are active on the display surface of the video display 18. When the hot spot of the cursor lies within the hot region, the state of the speech recognizer 20 is changed to the listening state from its current state. FIG. 2 depicts an illustration of hot regions 28A, 28B, 28C and 28D that are provided by the preferred embodiment of the present invention on a virtual desktop 26 that is displayed on the video display 18. Each hot region 28A, 28B, 28C and 28D constitutes an invisible window that occupies a small rectangular region, such as a 5 pixels by 5 pixels square. Those skilled in the art will appreciate that the hot regions may also have different geometric configurations other than a square. In the preferred embodiment of the present invention, the hot regions 28A, 28B, 28C and 28D occupy the corners of the virtual desktop 26. However, the hot regions may also be displayed on other areas of the video display 18. The hot regions 28A, 28B, 28C and 28D are positioned in the corners so as to be in low traffic areas and thus, decrease the likelihood that a user inadvertently activates the speech recognizer. For purposes of the discussion below, it will be assumed that the user only designates one hot region on the virtual desktop 26.

FIG. 2 shows the taskbar 30 that is provided by the "MICROSOFT" "WINDOWS" '95 operating system. The taskbar provides a mechanism for displaying buttons for all currently open tasks that have associated windows. A visual notification area 32 is provided on the taskbar. This visual notification area is described in more detail in co-pending application entitled "System Provided Visual Notification Area", which was filed on Dec. 13, 1994, Ser. No. 08/355,398 and U.S. Pat. No. 5,617,526 which is assigned to a common assignee. The contents of this co-pending application are explicitly incorporated by reference herein. The visual notification area 32 provides an area in which applications 24 may display icons that provide status information and that inform the user of events. Icon 34 that is displayed within the visual notification area 32 in FIG. 2 is the icon that is associated with the not listening state. Corresponding icons are also provided for the standing-by and listening states, as will be described in more detail below.

Figure 3:
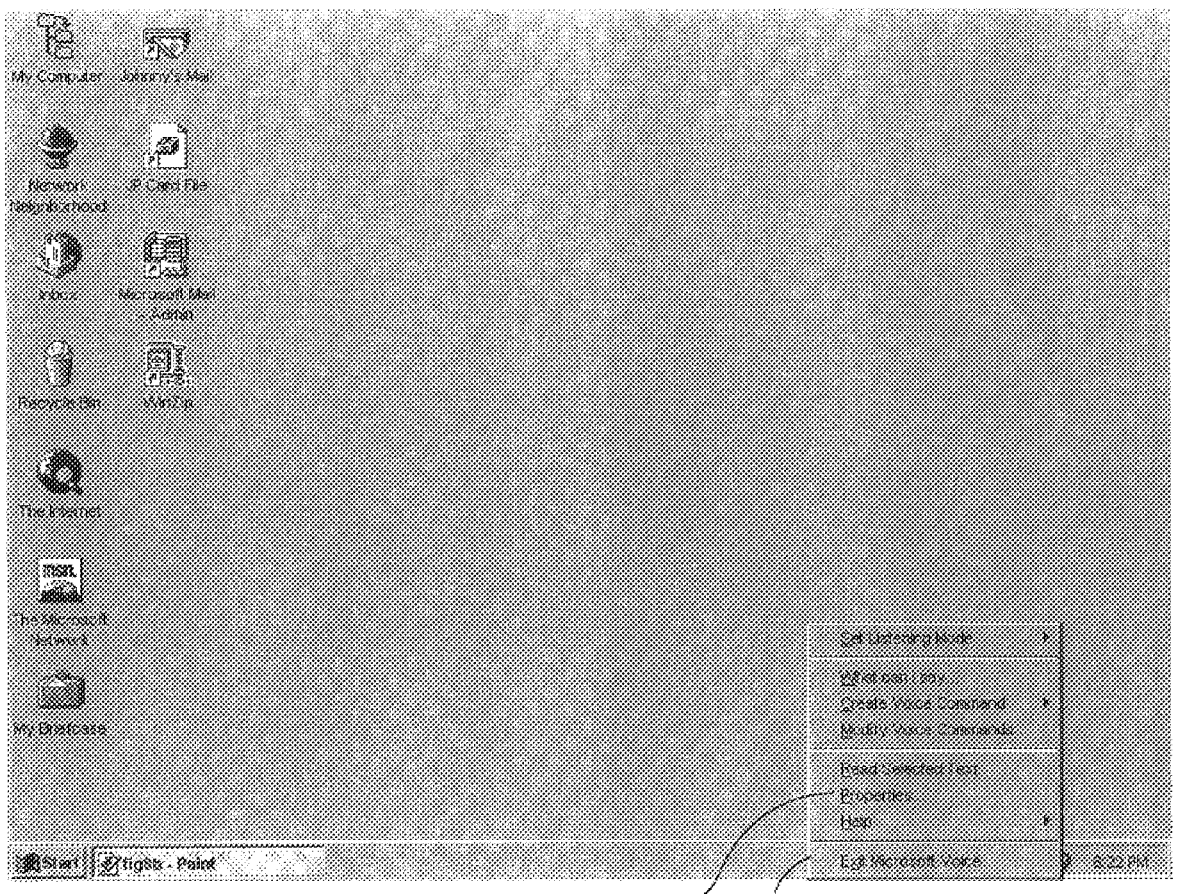
FIG. 3 illustrates a context menu that may be generated from voice facility generated icons in the preferred embodiment of the present invention.
Figure 4:
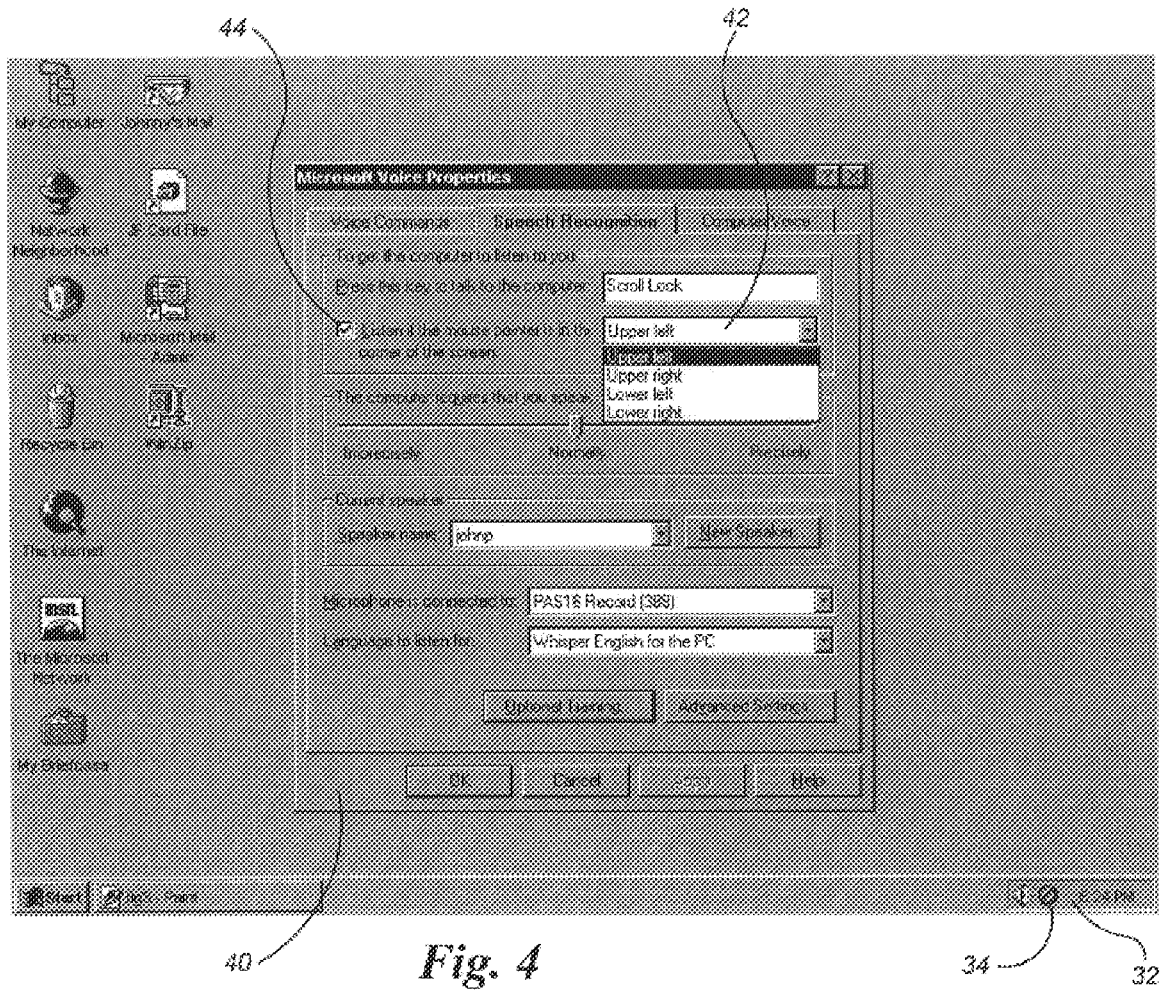
FIG. 4 illustrates a property sheet that may be used to select hot regions in accordance with the preferred embodiment of the present invention.

By positioning a mouse cursor to point at a state icon, such as icon 34, in the visual notification area 32, and then clicking a mouse button of the mouse 22, a user may cause context menu 38 (FIG. 3) to be displayed. One of the menu options that is contained on the context menu 36 is a properties option 38. When the user selects the properties option 38, a property sheet 40, like that shown in FIG. 4, is displayed. The speech recognition property sheet 40 includes a check box 44 that may be checked by a user to cause a speech recognizer to listen when the hot spot of the mouse cursor lies within one of the predefined hot regions. If the user chooses not to select the check box 44, the hot regions are not active, and the speech recognizer 20 does not toggle state when the hot spot of the mouse cursor lies in the hot region. The property sheet 40 also includes a drop down list box 42 that provides a user with the option of selecting the upper left hot region 28A, the upper right region 28C, the lower left hot region 28B or the lower right hot region 28D as the designated active hot region.

Figure 5:
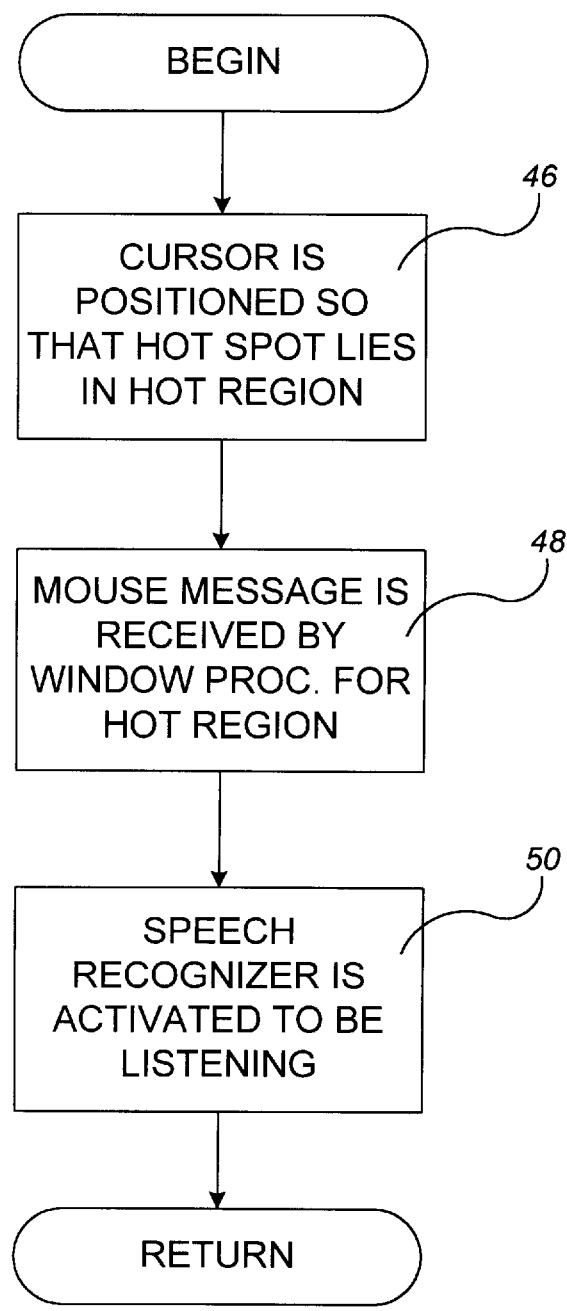
FIG. 5 is a flow chart illustrating the steps that are performed to activate the speech recognizer in accordance with the preferred embodiment of the present invention.
Figure 6:
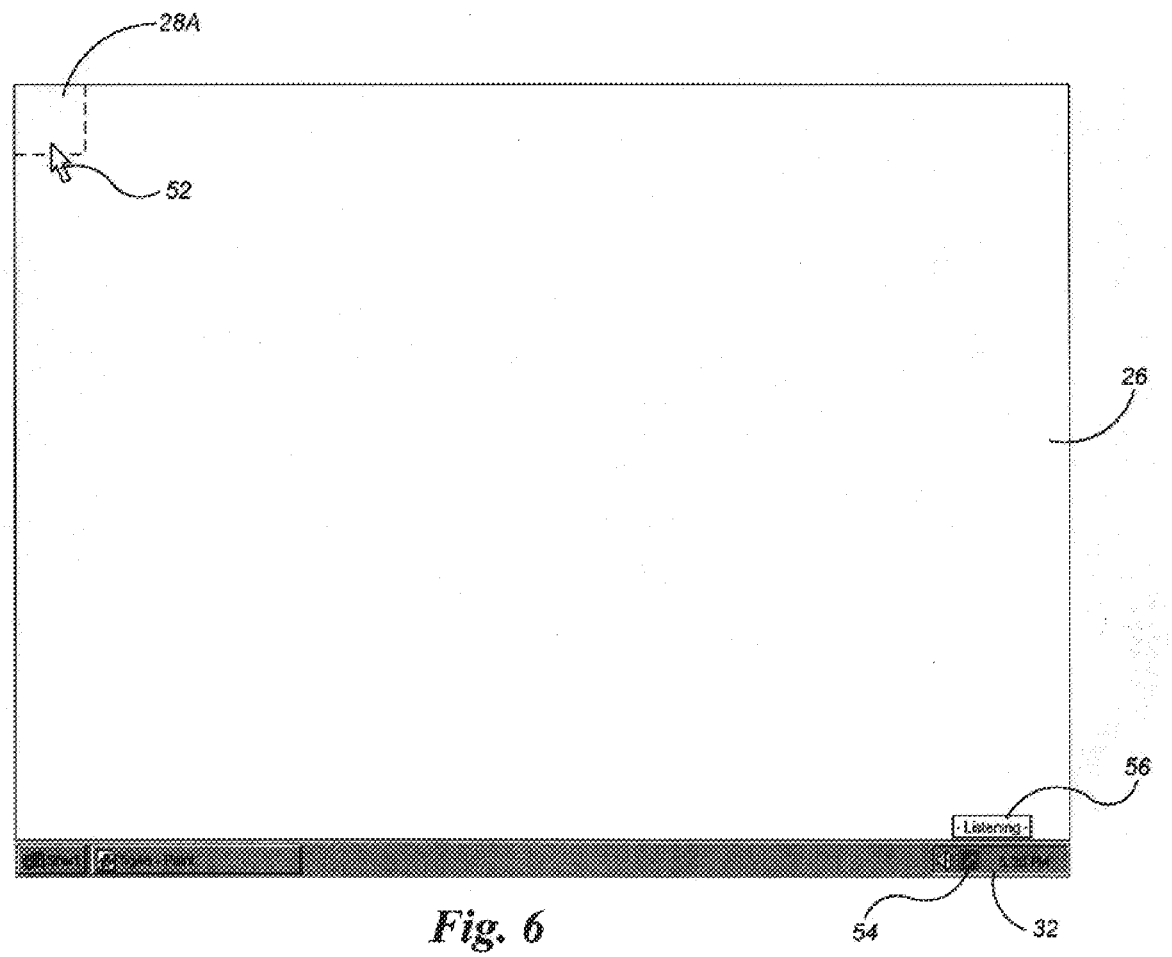
FIG. 6 illustrates an example of the appearance of the video display when the speech recognizer is activated in accordance with the preferred embodiment of the present invention.

FIG. 5 is a flow chart showing the steps that are performed to activate the speech recognizer 20 using the designated hot region. Initially, the user positions the mouse cursor so that the hot spot of the mouse cursor lies within the hot region (step 46). The mouse cursor may be manipulated by using the mouse 22, the keyboard 20 or the pointing device 24. The operating system 18 generates a mouse message in response to the movement of the mouse cursor. The mouse message by convention is received by the window procedure for the window in which the hot spot of the mouse cursor lies (i.e., the window for the hot region 28A) (step 48). The system now knows that the mouse cursor is positioned such that the hot spot of the mouse cursor lies in the designated hot region. As a result, the speech recognizer is activated to be in the listening state (step 50). FIG. 6 shows an illustration wherein the mouse cursor 52 is positioned so that its hot spot lies within the designated hot region 28A. In response to the toggling of the state to the listening state, the listening state icon 54 is displayed within the visual notification area 32. In addition, a tool tip window 56 is temporarily displayed in proximity to the listening icon 54 to provide a visual cue that the state of the system has changed.

Figure 7:
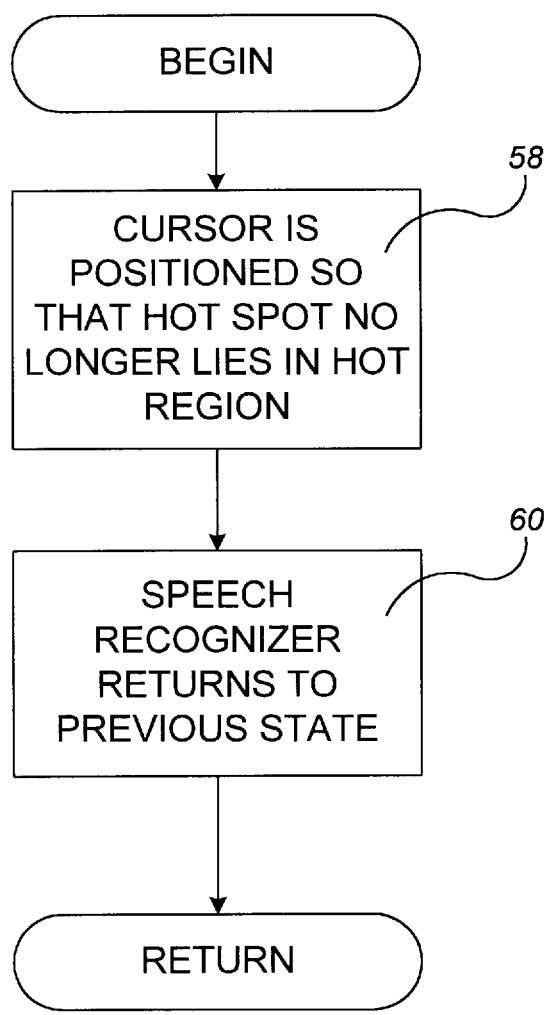
FIG. 7 is a flow chart illustrating the steps that are performed to return the speech recognizer to its previous state in accordance with the preferred embodiment of the present invention.
Figure 8A:
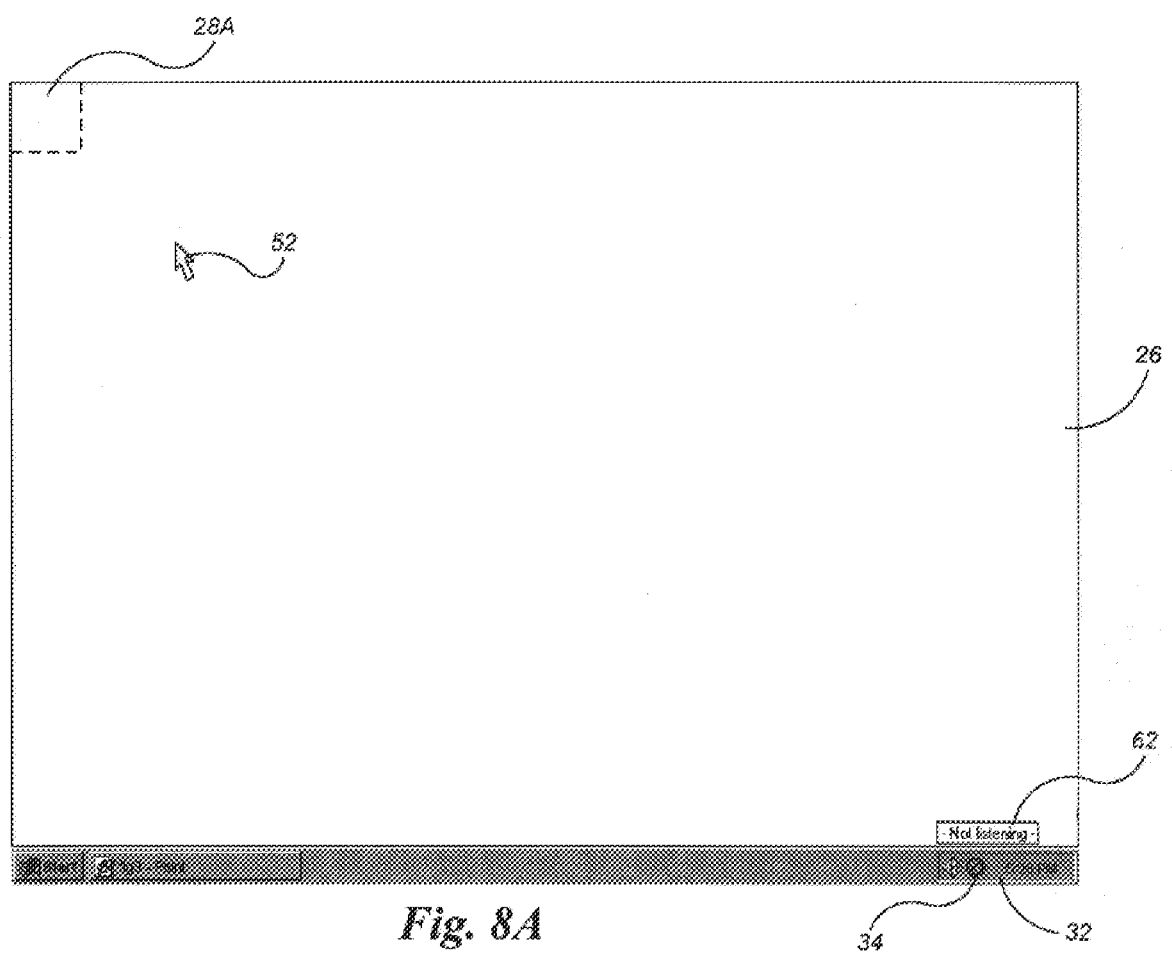
FIG. 8A shows an example of the appearance of the video display when the system returns to a not listening state in accordance with the preferred embodiment of the present invention.
Figure 8B:
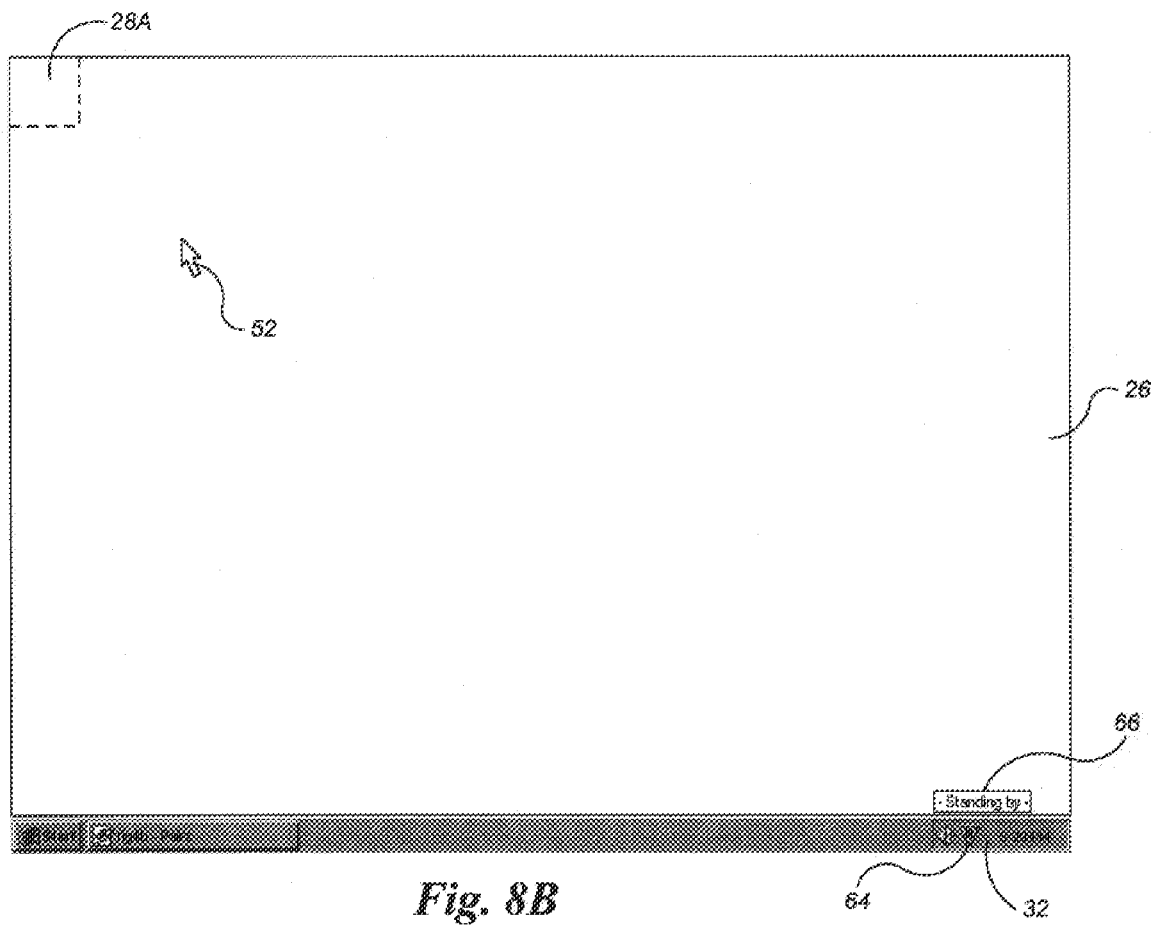
FIG. 8B illustrates an example of the appearance of the video display when the system returns to a standing by state in accordance with the preferred embodiment of the present invention.

FIG. 7 is a flow chart illustrating the steps that are performed when the cursor is removed from the hot region. Initially, the cursor is positioned so that the hot spot no longer lies in the hot region (step 58 in FIG. 7). In response to the cursor being positioned so that it no longer lies in the hot region, the speech recognizer returns to its previous state (step 60). The state of the speech recognizer is maintained in primary memory 14 so that the state can be returned to when the mouse cursor is removed from the designated hot region. Alternatively, the speech recognizer may return to its previous state automatically after processing an utterance of audio input. FIG. 8A shows an example wherein the speech recognizer was in a not listening state prior to the mouse cursor 52 being positioned so that the hot spot of the mouse cursor lies within the hot region 28A. When the mouse cursor 52 is removed from the hot region 28A, the state cursor is changed to the not listening state cursor 34 and a tool tip message 62 is displayed to indicate that the state has changed to the not listening state. FIG. 8B shows an example where the prior state was the standing-by state. In response to the mouse cursor 52 no longer lying in the hot region 28A, the state cursor is changed to the standing-by cursor 64 and a mouse message 66 is displayed to indicate the standing by state is the current state.

Thus, the preferred embodiment of the present invention allows a user to temporarily toggle the state of the speech recognizer to a listening state wherein the speech recognizer actively listens and processes audio input. The speech recognizer remains in the listening state only so long as the hot spot of the mouse cursor lies within the hot region. This aspect of the preferred embodiment of the present invention helps to minimize undue processing and erroneous processing of audio input. Furthermore, because the speech recognizer is triggered merely by moving the mouse cursor, it is not difficult for a user (even novice users) to trigger the activation and deactivation of the speech recognizer.

While the preferred embodiment of the present invention has been described with reference to a preferred embodiment thereof, those skilled in the art will appreciate that various changes in form and detail may be made without departing from the intended scope of the present invention as defined in the appended claims. For example, the present invention has been described relative to the use of a mouse to position a mouse cursor within a hot region. The present invention may also be practiced using other pointing input devices and using other gestures to trigger the activation and deactivation of a speech recognizer.

I claim:

1. In a computer system having a video display, an audio input device for receiving audio input, an input device for positioning a cursor on the video display and a speech recognizer for recognizing components of speech in the audio input, a method of comprising the computer-implemented steps of:

providing a designated hot region on the video display for activating the speech recognizer;

positioning the cursor over the hot region in response to a user using the input device for positioning the cursor; and activating the speech recognizer so that the speech recognizer processes audio input that is received through the audio input device, the activation of the speech recognizer being caused by the cursor being positioned over the hot region.

2. The method of claim 1 further comprising the step of changing the hot region to be a new region on the video display in response to a request by a user.

3. The method of claim 1 further comprising the step of providing at least one additional hot region on the video display for activating the speech recognizer.

4. The method of claim 1 further comprising the steps of:

positioning the cursor so that it is no longer over the hot region in response to the user using the input device for positioning the cursor; and deactivating the speech recognizer so that the speech recognizer does not process the audio input that is received through the audio input device, the deactivation of the speech recognizer being caused by the cursor no longer being over the hot region.

5. The method of claim 1 wherein immediately before the cursor is positioned over the hot region, the speech recognizer is in a non-listening state wherein the speech recognizer is not processing audio input received from the audio input device.

6. The method of claim 1 wherein the computer system further comprises a voice command unit for identifying and responding to voice commands in the components of speech that are recognized by the speech recognizer, and wherein before the cursor is positioned over the hot region, the speech recognizer processes audio input and the voice command unit only responds to voice commands that are prefaced by a trigger phrase.

7. The method of claim 1 wherein the input device for positioning the cursor on the video display is a mouse.

8. A computer system comprising:

a pointing input device;

an audio input device for receiving audio input;

a speech recognizer for recognizing components of speech in the audio input received by the audio input device;

a triggering mechanism for triggering the speech recognizer so that the speech recognizer is active and processing the audio input;

a video display;

a cursor that moves on the video display in response to the user using the pointing input device; and a hot region on the video display wherein the triggering mechanism automatically triggers the speech recognizer to be active when at least a portion of the cursor is over the hot region.

9. The computer system of claim 8 wherein the pointing input device is a mouse.

10. The computer system of claim 8 further comprising a deactivating mechanism for deactivating the speech recognizer so that the speech recognizer does not process the audio input when no portion of the cursor remains over the hot region.

11. The computer system of claim 8 further comprising an additional hot region that causes the trigger mechanism to automatically trigger the speech recognizer to be active when at least a portion of the cursor is over the additional hot region.

12. The computer system of claim 8 further comprising a hot region modifier for changing the hot region to occupy a different portion of the video display.

13. The computer system of claim 12 wherein the hot region modifier provides a user interface that enables the user to select the different portion of the video display that the hot region is to occupy.

14. The computer system of claim 8 further comprising a deactivating mechanism for deactivating the speech recognizer in response to the user using the pointing input device so that the speech recognizer does not process audio input.

15. A computer readable storage medium for use with a computer system that includes a video display, an audio input device for receiving audio input and a pointing input device, said storage medium storing:

a speech recognizer for recognizing components of speech in audio input from the audio input device; and a triggering mechanism for automatically triggering the speech recognizer to be active so that the speech recognizer processes audio input from the audio input device when a user uses the pointing input device to point at a hot region on the video display.

16. The storage medium of claim 15 further storing a deactivating mechanism for deactivating the speech recognizer in response to the user using the pointing input device such that the speech recognizer does not process the audio input.

* * * * *

UNITED STATES PATENT AND TRADEMARK OFFICE
CERTIFICATE OF CORRECTION

PATENT NO. : 5,857,172
DATED : January 5, 1999
INVENTOR(S) : Rozak

It is certified that error appears in the above-identified patent and that said Letters Patent is hereby corrected as shown below:

On the title page:
    Under [56] References Cited
    OTHER PUBLICATIONS

Insert --

Microsoft Corporation "User Guide - Microsoft® Word- The World's Most Popular Word Processor", Version 6, pp. 72-73, 1993 - 1994.

Signed and Sealed this

Nineteenth Day of October, 1999

Attest:

Q. TODD DICKINSON

*Attesting Officer*    *Acting Commissioner of Patents and Trademarks*